US012327226B2

(12) United States Patent
Edwards et al.

(10) Patent No.: US 12,327,226 B2
(45) Date of Patent: Jun. 10, 2025

(54) ELECTRONIC FUNDS TRANSFERS BASED ON AUTOMATIC CRYPTOCURRENCY TRANSACTIONS

(71) Applicant: Capital One Services, LLC, McLean, VA (US)

(72) Inventors: Joshua Edwards, Philadelphia, PA (US); Adam Vukich, Springfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/305,547

(22) Filed: Apr. 24, 2023

(65) Prior Publication Data

US 2023/0267427 A1  Aug. 24, 2023

Related U.S. Application Data

(60) Continuation of application No. 17/301,472, filed on Apr. 5, 2021, now Pat. No. 11,645,633, which is a
(Continued)

(51) Int. Cl.
*G06Q 20/00* (2012.01)
*G06Q 20/06* (2012.01)
(Continued)

(52) U.S. Cl.
CPC ....... *G06Q 20/065* (2013.01); *G06Q 20/3825* (2013.01); *G06Q 20/401* (2013.01); *H04L 63/083* (2013.01)

(58) Field of Classification Search
CPC ............ G06Q 20/065; G06Q 20/3825; G06Q 20/401; G06Q 20/223; G06Q 20/3678;
(Continued)

(56) References Cited

U.S. PATENT DOCUMENTS 10,970,685 B2    4/2021  Edwards et al.
2015/0363772 A1* 12/2015  Ronca ................ G06Q 20/3829
                                               705/71
(Continued)

OTHER PUBLICATIONS

Danova H., "How to Sell Bitcoins and Withdraw Funds to Credit Card," May 6, 2016, 5 pages. Retrieved from the Internet: [URL:https://blog.cex.io/news/how-sell-bitcoins-and-withdraw-card-15097].
(Continued)

*Primary Examiner* — Dante Ravetti
(74) *Attorney, Agent, or Firm* — Harrity & Harrity, LLP

(57) ABSTRACT

A device may obtain digital signature information relating to a quantity of a type of cryptocurrency, and receive transaction data relating to a credit account, associated with a user, after obtaining the digital signature information. The transaction data may include information identifying a transaction amount. The device may determine, after receiving the transaction data, an amount, of the type of cryptocurrency, that satisfies the transaction amount, perform, using the digital signature information, an action to conduct a sale of a portion of the quantity of the type of cryptocurrency based on determining the amount, and cause proceeds from the sale to be transferred to the credit account as payment for the transaction amount.

20 Claims, 7 Drawing Sheets

Related U.S. Application Data division of application No. 16/033,887, filed on Jul. 12, 2018, now Pat. No. 10,970,685.

(51) Int. Cl.
*G06Q 20/38* (2012.01)
*G06Q 20/40* (2012.01)
*H04L 9/40* (2022.01)

(58) Field of Classification Search
CPC .... G06Q 20/389; G06Q 20/02; H04L 63/083; H04L 9/3239; H04L 9/3247; H04L 9/50; H04L 2209/56
USPC ................ 705/16, 21, 59; 380/44, 262, 278
See application file for complete search history.

(56) References Cited

U.S. PATENT DOCUMENTS

| | | |
|---|---|---|
| 2018/0060860 A1 | 3/2018 | Tian et al. |
| 2018/0240112 A1* | 8/2018 | Castinado ............. H04L 9/0643 |
| 2019/0139033 A1 | 5/2019 | Ricotta et al. |
| 2019/0220859 A1 | 7/2019 | Weight et al. |
| 2021/0090166 A1 | 3/2021 | Bayne |
| 2021/0224758 A1 | 7/2021 | Edwards et al. |

OTHER PUBLICATIONS

Stackexchange, "Is there a way to pay my credit card balance with bitcoins?," Mar. 2014, 2 pages. Retrieved from the Internet: [URL:https://bitcoin.stackexchange.com/questions/23324/is-there-a-way-to-pay-my-credit-card-balance-with-bitcoins].

* cited by examiner

ELECTRONIC FUNDS TRANSFERS BASED ON AUTOMATIC CRYPTOCURRENCY TRANSACTIONS

RELATED APPLICATION

This application is a continuation of U.S. patent application of Ser. No. 17/301,472, filed Apr. 5, 2021 (now U.S. Pat. No. 11,645,633)), which is a divisional of U.S. patent application Ser. No. 16/033,887, filed Jul. 12, 2018 (now U.S. Pat. No. 10,970,685), the contents of which are incorporated herein by reference in their entireties.

BACKGROUND

A cryptocurrency is a digital currency in which transactions are secured via cryptography.

SUMMARY

According to some possible implementations, a method may include obtaining, by a device, authorization or authentication information for a cryptocurrency account. The cryptocurrency account may be associated with a user. The cryptocurrency account may have a quantity of a type of cryptocurrency. The method may include receiving, by the device, transaction data relating to a financial account after obtaining the authorization or authentication information. The financial account may be associated with the user. The transaction data may include information identifying a transaction amount. The method may include determining, by the device and after receiving the transaction data, an amount, of the type of cryptocurrency, that satisfies the transaction amount, accessing, by the device and after receiving the transaction data, the cryptocurrency account using the authorization or authentication information, performing, by the device and after accessing the cryptocurrency account, an action to conduct a sale of a portion of the quantity of the type of cryptocurrency in the cryptocurrency account based on determining the amount, and causing, by the device, proceeds from the sale to be transferred to the financial account as payment for the transaction amount.

According to some possible implementations, a device may include one or more memories; and one or more processors communicatively coupled to the one or more memories, configured to obtain digital signature information relating to a quantity of a type of cryptocurrency, and receive transaction data relating to a credit account, associated with a user, after obtaining the digital signature information. The transaction data may include information identifying a transaction amount. The one or more processors may be configured to determine, after receiving the transaction data, an amount, of the type of cryptocurrency, that satisfies the transaction amount, perform, using the digital signature information, an action to conduct a sale of a portion of the quantity of the type of cryptocurrency based on determining the amount, and cause proceeds from the sale to be transferred to the credit account as payment for the transaction amount.

According to some possible implementations, a non-transitory computer-readable medium may store instructions. The instructions may include one or more instructions that, when executed by one or more processors, cause the one or more processors to obtain access information for a cryptocurrency account. The cryptocurrency account may be associated with a user. The cryptocurrency account may have a first quantity of a first type of cryptocurrency and a second quantity of a second type of cryptocurrency. The first type of cryptocurrency and the second type of cryptocurrency may be associated with one or more rules governing sales of the first type of cryptocurrency and the second type of cryptocurrency. The instructions may include one or more instructions that, when executed by the one or more processors, cause the one or more processors to receive transaction data relating to a credit-based account, associated with the user, after obtaining the access information. The transaction data may identify a transaction amount. The instructions may include one or more instructions that, when executed by the one or more processors, cause the one or more processors to determine, after receiving the transaction data, an amount, of the first type of cryptocurrency or the second type of cryptocurrency, that satisfies the transaction amount, access, after receiving the transaction data, the cryptocurrency account using the access information, perform, after accessing the cryptocurrency account, an action to conduct a sale of a first portion of the first quantity of the first type of cryptocurrency or a second portion of the second quantity of the second type of cryptocurrency based on determining the amount and based on the one or more rules, and cause proceeds from the sale to be transferred to the credit-based account.

DETAILED DESCRIPTION

Figure 1A:
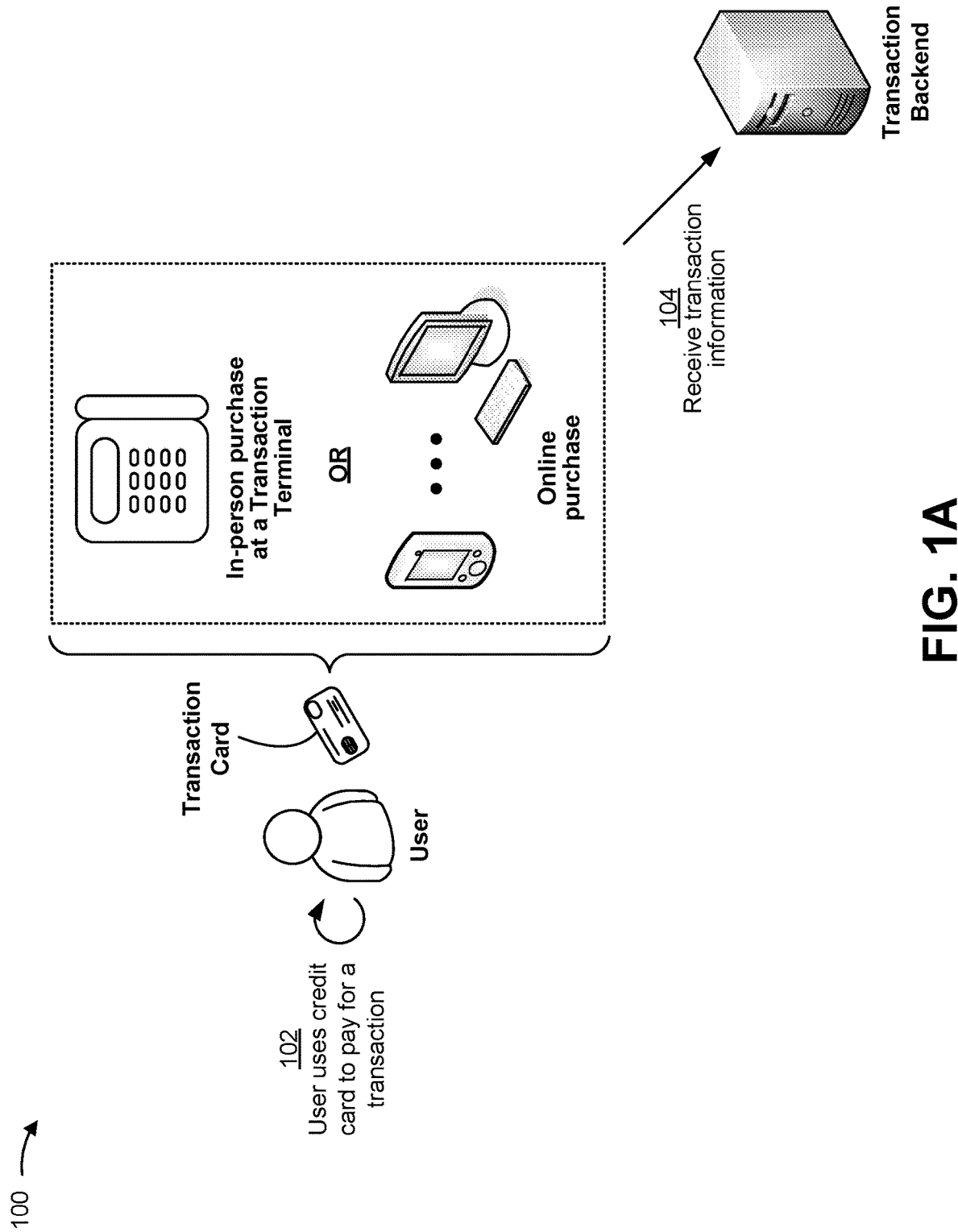
FIGS. 1A and 1B are diagrams of an example implementation described herein.

The following detailed description of example implementations refers to the accompanying drawings. The same reference numbers in different drawings may identify the same or similar elements.

More people are investing in cryptocurrencies as the popularity of these digital assets continues to rise. However, the ability to leverage such assets for typical transactions, such as to automatically pay for a purchase made using a credit card, is still limited.

Some implementations, described herein, provide a device (e.g., a transaction backend and/or the like) that is capable of automatically conducting sale(s) of a user's cryptocurrency based on transactions conducted using the user's financial account (e.g., a credit-based account, such as a credit card account, and/or the like). In some implementations, and in a case where a user's cryptocurrency is held in a cryptocurrency account managed by a cryptocurrency exchange, the device is capable of accessing the user's cryptocurrency account via the user's authentication credentials and/or an access token. In some implementations, and in a case where the user manages the user's cryptocurrency independently, the device is capable of accessing the cryptocurrency via cryptocurrency-related private keys. In some implementations, the device is capable of conducting sale(s)

of an amount of the user's cryptocurrency that covers the user's credit-based transaction amount(s) as well as any needed transaction costs (e.g., fees charged by a cryptocurrency exchange to facilitate the sale(s), fees relating to data processing associated with cryptocurrency transactions (such as "miner" fees, "gas" costs, and/or the like), and/or the like), and causing funds or proceeds from the sale(s) to be transferred to the user's credit-based account (e.g., via Automated Clearing House (ACH)). In some implementations, the device is capable of permitting a user to set rules that govern sale(s) of the user's cryptocurrency, including rules associated with multiple types of cryptocurrency (e.g., in a case where the user owns multiple types of cryptocurrency) depending on current market values of the cryptocurrencies.

In this way, a user may utilize a traditional payment method, such as a credit card, to make purchases, and have a balance on the payment account to be automatically paid off using the user's cryptocurrency. Automatic triggering of sale(s) of a user's cryptocurrency reduces or eliminates a need for the user to perform any actions using a computing device to conduct such sale(s), which reduces or eliminates the possibility of human error, and conserves power resources, computing resources, and memory resources of the computing device. In addition, permitting a user to set rules that govern sale(s) of the user's cryptocurrency, depending on a current market value of the cryptocurrency, also avoids cryptocurrency sales at values that are inconsistent with the user's perceived value of the cryptocurrency. Furthermore, automatic determinations of transaction costs, associated with a cryptocurrency sale, also reduce or eliminate a need for the user to manually determine such costs (which would otherwise be inefficient and error prone).

Figure 1B:
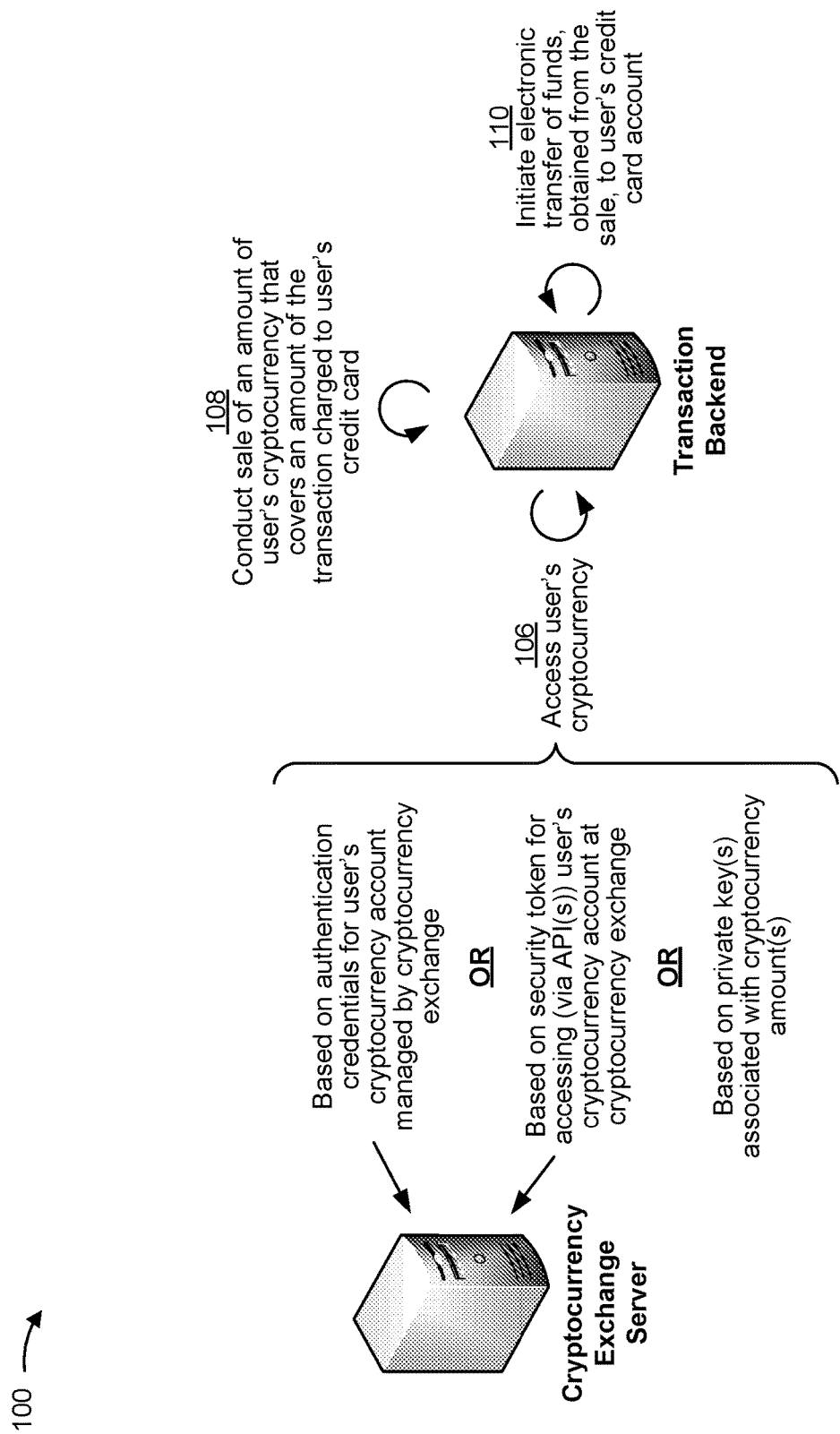

FIGS. 1A and 1B are diagrams of an example implementation 100 described herein. Example implementation 100 may include a user's transaction card (e.g., a credit card and/or the like), a transaction backend, and a cryptocurrency exchange server. The transaction backend may be associated with a financial institution (e.g., a bank, a credit union, and/or the like) at which a credit-based account (e.g., a credit card account and/or the like), associated with the user's transaction card, may be held. The cryptocurrency exchange server may be associated with a cryptocurrency exchange that is capable of managing users' cryptocurrency accounts, and facilitating cryptocurrency transactions between the users.

As shown in FIG. 1A, and as shown by reference number 102, the user may use a transaction card to pay for a transaction. For example, the user may use a credit card to make an in-person purchase at a transaction terminal or an online purchase over the Internet. As shown by reference number 104, the transaction backend may receive transaction information. For example, the transaction backend may receive, from the transaction terminal, or another transaction card processing device, transaction information relating to the purchase made by the user.

As shown in FIG. 1B, and as shown by reference number 106, the transaction backend may access the user's cryptocurrency. For example, in a case where the user's cryptocurrency is held in a cryptocurrency account managed by a cryptocurrency exchange, the transaction backend may access the user's cryptocurrency based on authentication credentials for the user's cryptocurrency account (e.g., a username and password combination and/or the like provided by the user), or based on a security token (e.g., an open authentication (OAuth)-based token provided by the user) and one or more application programming interface (API) calls. In some implementations, the transaction backend may be configured to communicate with the cryptocurrency exchange through APIs or, in a case where the cryptocurrency exchange does not provide APIs, the transaction backend may be configured to communicate with the cryptocurrency exchange via automated web-based interactions (e.g., "web scraping"), where one or more scripts may be created and utilized to automatically visit the cryptocurrency exchange's web site, input the user's authentication credentials to log onto the user's cryptocurrency account, click various buttons and/or links on the web site, and/or the like to conduct cryptocurrency transactions on the user's behalf. As another example, in a case where the user manages the user's cryptocurrency independently, the transaction backend may access the user's cryptocurrency based on private key(s) associated with the user's cryptocurrency (e.g., private key(s), associated with various amounts of the cryptocurrency, provided by the user).

As shown by reference number 108, the transaction backend may conduct a sale of an amount of the user's cryptocurrency that covers an amount of the transaction charged to the user's credit-based account and/or a balance in the user's credit-based account. In a case where the user's cryptocurrency is held in a cryptocurrency account managed by a cryptocurrency exchange, the transaction backend may cause one or more sales of cryptocurrency, in the cryptocurrency account, to be conducted in order to obtain funds to pay for the credit-based transaction and/or the credit-based account balance. In a case where the user's cryptocurrency is managed independently, the transaction backend may utilize one or more of the user's private keys to conduct one or more sales of the cryptocurrency. In this case, the transaction backend may communicate with one or more cryptocurrency exchanges, and instruct the cryptocurrency exchange(s) to conduct the sale(s).

As shown by reference number 110, the transaction backend may automatically initiate an electronic transfer of funds, obtained from the sale(s) of the cryptocurrency, to the user's credit-based account. For example, the transaction backend may initiate a transfer of an appropriate portion of the funds (e.g., that corresponds to the credit-based transaction amount and/or the credit-based account balance) via ACH.

In some situations, a merchant, such as a restaurant and/or the like, may have a user's credit-based account authorized for a first transaction amount (e.g., for a cost of a meal), but may settle the transaction at a second transaction amount (e.g., a higher amount that includes tips and/or the like). In such situations, and to avoid initiating a sale of the user's cryptocurrency that covers only the authorized, first transaction amount (and not the settled, second transaction amount), the transaction backend may not trigger sale(s) of a user's cryptocurrency until the credit-based transaction is actually settled.

A cryptocurrency transaction typically involves transaction processing fees that need to be paid to third parties that are willing to process the transaction (e.g., fees relating to computing operations (e.g., to load value(s) into memory, perform hash function(s), and/or the like), time to process the transaction, storage space for digitally signing a transaction, which may vary depending on a size of the transaction, and/or the like). For example, a transaction involving the cryptocurrency, Ethereum, involves a "gas" cost, a transaction involving the cryptocurrency, Bitcoin, involves a "miner" cost, and other cryptocurrencies may be associated with similar costs. Thus, in a case where a user independently manages the user's cryptocurrency, and provides, to the transaction backend, private key(s) for use with sale(s) of the cryptocurrency, the transaction backend may cause an amount of the cryptocurrency to be sold such that funds from the sale cover not only the credit-based transaction or the credit-based account balance, but also the above-mentioned transaction costs/fees needed to perform the sale of the cryptocurrency. In a case where the transaction costs/fees are to be paid using the cryptocurrency itself (rather than using funds from the sale, such as fiat money and/or the like), the transaction backend may ensure that a sufficient amount of the cryptocurrency is sold so as to cover the needed transaction costs/fees. In addition, where such a sale is conducted via a cryptocurrency exchange, the transaction backend may also ensure that the amount of the cryptocurrency to be sold is such that funds from the sale also covers any exchange-related fees, including any fees associated ACH transfers.

In some implementations, the transaction backend may permit a user to define one or more rules associated with sales of the user's cryptocurrency. The rule(s) may be stored in memory on, or accessible to, the transaction backend (e.g., as part of a user's profile for a credit-based account and/or the like), stored in memory on, or accessible to, the cryptocurrency exchange server (e.g., as part of a user's profile for a cryptocurrency account), and/or the like.

A value of a cryptocurrency, relative to an official currency, such as the United States dollar and/or the like, may fluctuate over time. Thus, to avoid a sale of the cryptocurrency when a value of that cryptocurrency (e.g., as perceived by the user) is low, the user may define one or more rules that prevent a sale of the cryptocurrency if a value of the cryptocurrency (e.g., at or near a time that the sale is to be conducted) does not satisfy a threshold (e.g., is less than a certain dollar amount). In such a case, in the event that the user makes a credit-based purchase, and the value of the cryptocurrency indeed does not satisfy the threshold, the transaction backend may not conduct any sale(s) of the user's cryptocurrency, and a balance for the credit-based purchase may remain in the user's credit-based account. In some implementations, and in a case where the value of the cryptocurrency does not satisfy the threshold, the transaction backend may monitor (e.g., periodically, continuously, based on user input, and/or the like over the course of a day, a week, and/or the like) the value of the cryptocurrency, and initiate sale(s) of the cryptocurrency when the value of the cryptocurrency does satisfy the threshold.

In some cases, a user may own multiple types of cryptocurrency, including, for example, Bitcoin, Ethereum, Bitcoin Cash, Ripple, Stellar, Litecoin, Cardano, NEO, EOSIO, and/or the like. In such cases, the user may define one or more rules that associate one or more of the types of cryptocurrency with one or more thresholds. For example, a user may define one or more rules that set a first type of cryptocurrency (e.g., Bitcoin) as a default cryptocurrency to sell, but that prevent a sale of the first type of cryptocurrency if a value of the first type of cryptocurrency does not satisfy a threshold (e.g., is less than a certain dollar amount). Continuing the example, the user may define rule(s) that permit a sale of a second type of cryptocurrency (e.g., Ethereum) if a value of the first type of cryptocurrency does not satisfy the threshold, and if a value of the second type of cryptocurrency satisfies another threshold (e.g., is greater than or equal to a certain dollar amount). As another example, a user may define one or more rules that prevent a sale of any of the user's cryptocurrencies if none of the values of the cryptocurrencies satisfies an associated threshold. Thus, a user may define rules that govern sale(s) of the user's cryptocurrencies based on market values of the cryptocurrencies, thereby avoiding the sale of a cryptocurrency when a value of the cryptocurrency is inconsistent with the user's perceived value of that cryptocurrency.

As an additional example, a user may define one or more rules that prevent a sale of any of the user's cryptocurrencies until a total transaction amount, relating to one or more credit-based transactions, satisfies a threshold (e.g., exceeds a certain dollar amount, such as $5,000 and/or the like, whether in a single transaction or over multiple transactions). As a further example, a user may define one or more rules that governs the periodicity of cryptocurrency sales, such as permitting the transaction backend to conduct sales of the user's cryptocurrencies only a certain quantity of times a day, every two days, every week, and/or the like.

In some implementations, the transaction backend may automatically define rules based on a user's historical activities relating to cryptocurrency transactions (e.g., based on the user's prior purchases and/or sales of cryptocurrencies in the user's cryptocurrency account). In some implementations, the transaction backend may propose such rules to the user for the user's feedback.

In some implementations, the transaction backend may use one or more machine learning algorithms configured to automatically determine whether a sale of a user's cryptocurrency is appropriate and/or to determine which of a user's cryptocurrencies is to be sold. For example, in some implementations, the transaction backend may provide various types of information as input to one or more machine learning algorithms, which may perform machine learning to automate future determinations of whether a sale of a user's cryptocurrency is appropriate and/or future determinations of which of a user's cryptocurrencies is to be sold. For example, the transaction backend may train a machine learning algorithm based on known inputs (e.g., data on the types of cryptocurrency, information regarding an available amount of each type of cryptocurrency possessed by the user, information regarding market trends, news information regarding the types of cryptocurrency, information regarding user preferences (e.g., based on the user's historical activity relating to cryptocurrency transactions), information regarding transaction amounts posted to the user's credit-based account, information regarding cryptocurrency transaction costs, information regarding cryptocurrency exchange-related fees, and/or the like) and known outputs (e.g., sales of the user's cryptocurrencies). In some implementations, the transaction backend may refine a machine learning algorithm based on feedback received from the user and/or from one or more devices (e.g., management device(s)). For example, the user and/or one or more management devices may provide information indicating whether a particular determination of one or more of the user's cryptocurrencies to sell, made by the machine learning algorithm, is appropriate and/or accurate. When the information indicates that the particular determination is appropriate and/or accurate, the transaction backend may configure the machine learning algorithm to make further determinations of the user's cryptocurrencies to sell based on the particular determination. When the information indicates that the particular determination is not appropriate and/or not accurate, the transaction backend may configure the machine learning algorithm to avoid making further determinations in a manner in which the particular determination was made. Thus, the transaction backend may determine whether a sale of a user's cryptocurrency is appropriate and/or determine which of a user's cryptocurrencies is to be sold based on a machine learning algorithm, which improves the accuracy of the determinations, and conserves processor resources and/or storage resources that may otherwise be used to generate and store rules for making such determinations.

In this way, a user may utilize a traditional payment method, such as a credit card, to make purchases, and have a balance on the payment account to be automatically paid off using the user's cryptocurrency. Automatic triggering of sale(s) of a user's cryptocurrency reduces or eliminates a need for the user to perform any actions using a computing device to conduct such sale(s), which reduces or eliminates the possibility of human error, and conserves power resources, computing resources, and memory resources of the computing device. In addition, permitting a user to set rules that govern sale(s) of the user's cryptocurrency, depending on a current market value of the cryptocurrency, also avoids cryptocurrency sales at values that are inconsistent with the user's perceived value of the cryptocurrency. Furthermore, automatic determinations of transaction costs, associated with a cryptocurrency sale, also reduce or eliminate a need for the user to manually determine such costs (which would otherwise be inefficient and error prone).

As indicated above, FIGS. 1A and 1B are provided merely as examples. Other examples are possible and may differ from what was described with regard to FIGS. 1A and 1B.

Figure 2:
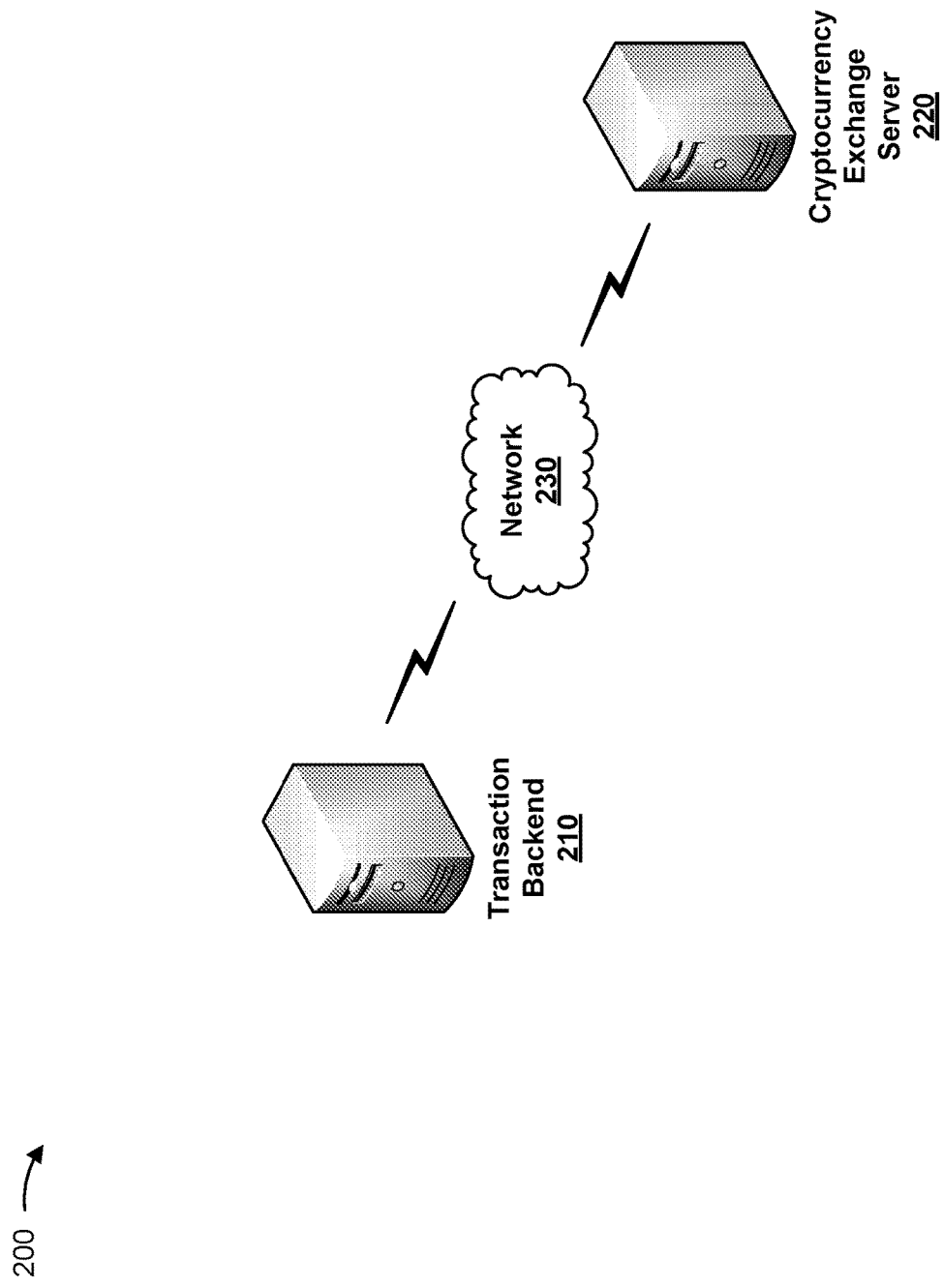
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a transaction backend 210, a cryptocurrency exchange server 220, and a network 230. Devices of environment 200 may interconnect via wired connections, wireless connections, or a combination of wired and wireless connections.

Transaction backend 210 includes one or more devices associated with banks and/or transaction card associations that authorize transactions and/or facilitate a transfer of funds or payments between an account of a cardholder of a transaction card (e.g., a credit card and/or the like) and an account of an individual or business of a transaction terminal, a transaction card processing device, and/or the like. For example, transaction backend 210 may include one or more devices of one or more issuing banks associated with a cardholder of a transaction card, one or more devices of one or more acquiring banks (or merchant banks) associated with a transaction terminal, a transaction card processing device, and/or the like, and/or one or more devices associated with one or more card associations (e.g., VISA®, MASTERCARD®, and/or the like) associated with a transaction card. Accordingly, in response to receiving transaction card data associated with a transaction card from a transaction terminal, a transaction card processing device, and/or the like, various banking institutions and/or card associations of transaction backend 210 may communicate to authorize the transaction and/or transfer funds between the accounts associated with the transaction card and the transaction terminal, the transaction card processing device, and/or the like. In some implementations, transaction backend 210 may automatically access a user's cryptocurrency (e.g., held in a cryptocurrency account managed by a cryptocurrency exchange or managed independently by the user), conduct sale(s) of the user's cryptocurrency, transfer funds, from the sale(s), to the user's credit-based account to pay a balance owed in the credit-based account, as described elsewhere herein.

In some implementations, transaction backend 210 may include one or more devices associated with a rewards program relating to a transaction card and/or an entity (e.g., a bank, a merchant, a service provider, a vendor, and/or the like) associated with the transaction card and/or a transaction terminal, a transaction card processing device, and/or the like. For example, transaction backend 210 may authorize the earning and/or redemption of rewards (e.g., rewards points associated with a transaction card, cash rewards, client loyalty rewards associated with an entity associated with a transaction terminal, a transaction card processing device, and/or the like, and/or the like) based on a transaction processed by the transaction terminal, the transaction card processing device, and/or the like with the transaction card.

Cryptocurrency exchange server 220 includes one or more devices capable of receiving, storing, providing, generating, and/or processing cryptocurrency transactions associated with transaction backend 210. For example, cryptocurrency exchange server 220 may include a server (e.g., a multi-server micro data center), a workstation computer, a virtual machine (VM) implemented by a computing device provided in a cloud computing environment, or a similar type of device. Cryptocurrency exchange server 220 may be associated with a cryptocurrency exchange that is capable of managing users' cryptocurrency accounts, and facilitating cryptocurrency transactions between the users as a matching platform (e.g., by serving as a market maker). Cryptocurrency exchange server 220 may be capable of accepting credit card payments, wire transfers, postal money orders, cryptocurrency or other forms of payment in exchange for digital currencies. Cryptocurrency exchange server 220 may be capable of sending cryptocurrency to a user's personal cryptocurrency wallet. In some implementations, cryptocurrency exchange server 220 may conduct sale(s) of a user's cryptocurrency based on instructions from transaction backend 210, as described elsewhere herein.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
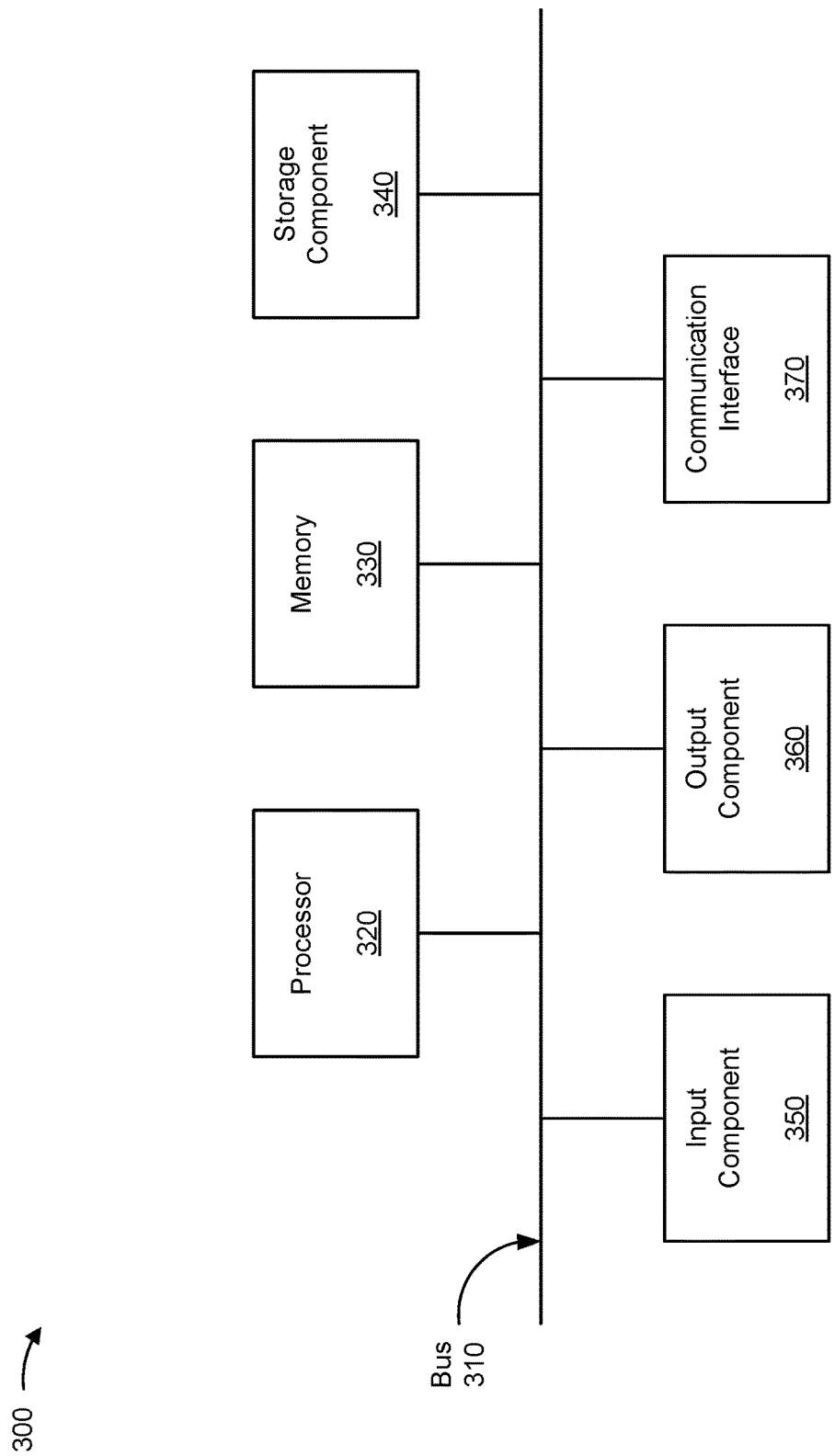
FIG. 3 is a diagram of example components of one or more devices of FIG. 2.

FIG. 3 is a diagram of example components of a device 300. Device 300 may correspond to transaction backend 210 and/or cryptocurrency exchange server 220. In some implementations, transaction backend 210 and/or cryptocurrency exchange server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
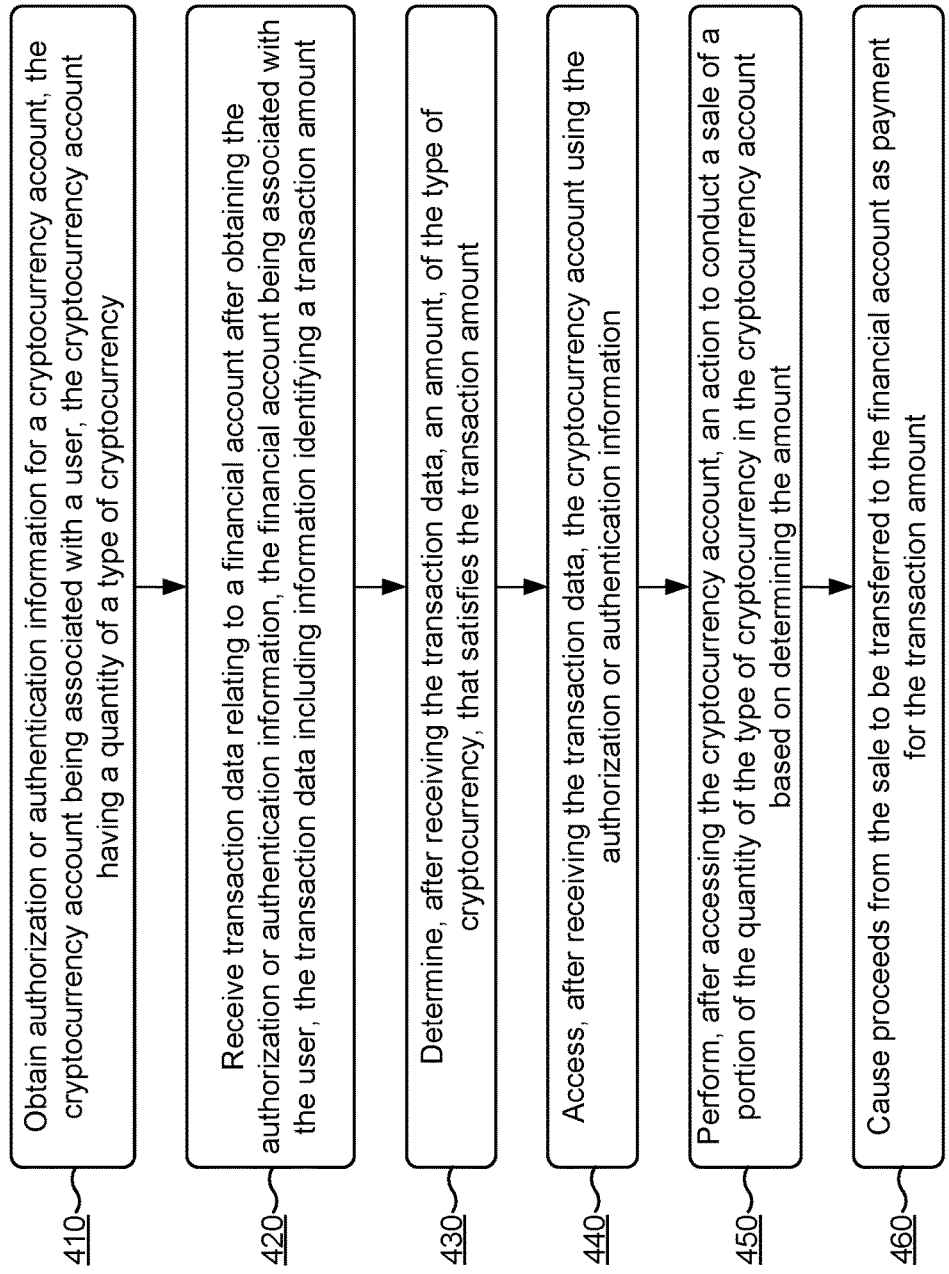
FIG. 4 is a flow chart of an example process for automatically conducting a sale of a user's cryptocurrency.

FIG. 4 is a flow chart of an example process 400 for automatically conducting a sale of a user's cryptocurrency. In some implementations, one or more process blocks of FIG. 4 may be performed by transaction backend 210. In some implementations, one or more process blocks of FIG. 4 may be performed by another device or a group of devices separate from or including transaction backend 210, such as cryptocurrency exchange server 220.

As shown in FIG. 4, process 400 may include obtaining authorization or authentication information for a cryptocurrency account (block 410). For example, transaction backend 210 (e.g., using processor 320, memory 330, storage component 340, input component 350, communication interface 370, and/or the like) may obtain authorization or authentication information for a cryptocurrency account, as described above in connection with FIGS. 1A and 1B. In some implementations, the cryptocurrency account may be associated with a user. In some implementations, the cryptocurrency account may have a quantity of a type of cryptocurrency.

As further shown in FIG. 4, process 400 may include receiving transaction data relating to a financial account after obtaining the authorization or authentication information (block 420). For example, transaction backend 210 (e.g., using processor 320, memory 330, storage component 340, communication interface 370, and/or the like) may receive transaction data relating to a financial account after obtaining the authorization or authentication information, as described above in connection with FIGS. 1A and 1B. In some implementations, the financial account may be associated with the user. In some implementations, the transaction data may include information identifying a transaction amount.

As further shown in FIG. 4, process 400 may include determining, after receiving the transaction data, an amount, of the type of cryptocurrency, that satisfies the transaction amount (block 430). For example, transaction backend 210 (e.g., using processor 320, memory 330, storage component 340, communication interface 370, and/or the like) may determine, after receiving the transaction data, an amount, of the type of cryptocurrency, that satisfies the transaction amount, as described above in connection with FIGS. 1A and 1B.

As further shown in FIG. 4, process 400 may include accessing, after receiving the transaction data, the cryptocurrency account using the authorization or authentication information (block 440). For example, transaction backend 210 (e.g., using processor 320, memory 330, storage component 340, communication interface 370, and/or the like) may access, after receiving the transaction data, the cryptocurrency account using the authorization or authentication information, as described above in connection with FIGS. 1A and 1B.

As further shown in FIG. 4, process 400 may include performing, after accessing the cryptocurrency account, an action to conduct a sale of a portion of the quantity of the type of cryptocurrency in the cryptocurrency account based on determining the amount (block 450). For example, transaction backend 210 (e.g., using processor 320, memory 330, storage component 340, communication interface 370, and/or the like) may perform, after accessing the cryptocurrency account, an action to conduct a sale of a portion of the quantity of the type of cryptocurrency in the cryptocurrency account based on determining the amount, as described above in connection with FIGS. 1A and 1B.

As further shown in FIG. 4, process 400 may include causing proceeds from the sale to be transferred to the financial account as payment for the transaction amount (block 460). For example, transaction backend 210 (e.g., using processor 320, memory 330, storage component 340, communication interface 370, and/or the like) may cause proceeds from the sale to be transferred to the financial account as payment for the transaction amount, as described above in connection with FIGS. 1A and 1B.

Process 400 may include additional implementations, such as any single implementation or any combination of implementations described below and/or in connection with one or more other processes described elsewhere herein.

In some implementations, transaction backend 210 may identify one or more rules associated with sales of the type of cryptocurrency in the cryptocurrency account. In some implementations, transaction backend 210 may perform the action based on the one or more rules. In some implementations, the one or more rules may define a threshold relating to a value of the type of cryptocurrency. In some implementations, transaction backend 210 may perform the action based on a current value of the type of cryptocurrency satisfying the threshold.

In some implementations, the authorization or authentication information may include a username for the cryptocurrency account and a password for the cryptocurrency account. In some implementations, the authorization or authentication information may include an access token.

In some implementations, the cryptocurrency account may be maintained by a cryptocurrency exchange. In some implementations, transaction backend 210 may instruct the cryptocurrency exchange to conduct the sale.

In some implementations, transaction backend 210 may determine that the transaction amount is a settled amount. In some implementations, transaction backend 210 may perform the action based on determining that the transaction amount is a settled amount. In some implementations, the type of cryptocurrency may include Bitcoin, Ethereum, Bitcoin Cash, Ripple, Stellar, Litecoin, Cardano, NEO, or EOSIO.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
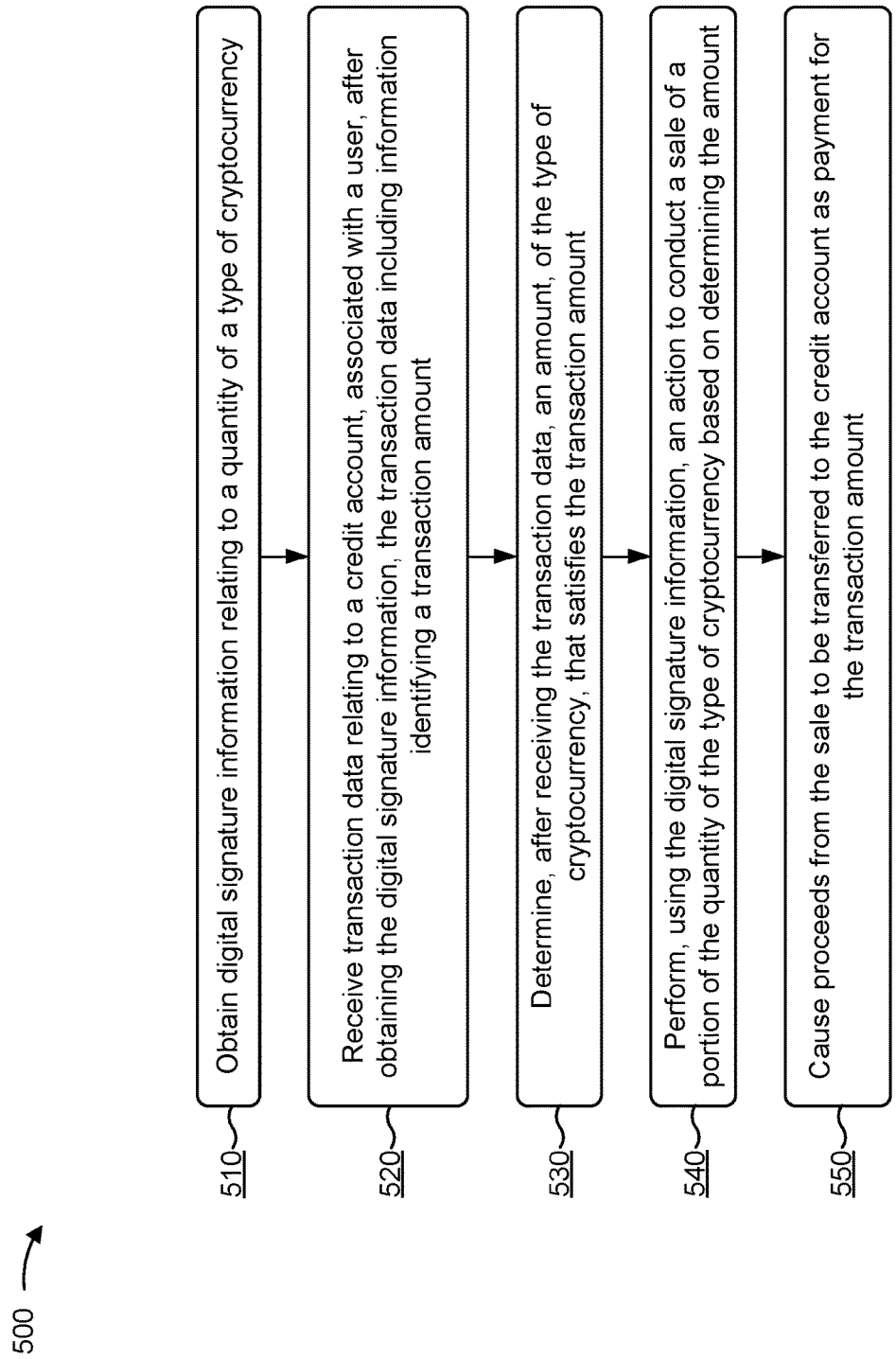
FIG. 5 is a flow chart of an example process for automatically conducting a sale of a user's cryptocurrency.

FIG. 5 is a flow chart of an example process 500 for automatically conducting a sale of a user's cryptocurrency. In some implementations, one or more process blocks of FIG. 5 may be performed by transaction backend 210. In some implementations, one or more process blocks of FIG. 5 may be performed by another device or a group of devices separate from or including transaction backend 210, such as cryptocurrency exchange server 220. In some implementations, a device (e.g., transaction backend 210) may include one or more memories, and one or more processors, communicatively coupled to the one or more memories, configured to perform process 500.

As shown in FIG. 5, process 500 may include obtaining digital signature information relating to a quantity of a type of cryptocurrency (block 510). For example, transaction backend 210 (e.g., using processor 320, memory 330, storage component 340, input component 350, communication interface 370, and/or the like) may obtain digital signature information relating to a quantity of a type of cryptocurrency, as described above in connection with FIGS. 1A and 1B.

As further shown in FIG. 5, process 500 may include receiving transaction data relating to a credit account, associated with a user, after obtaining the digital signature information (block 520). For example, transaction backend 210 (e.g., using processor 320, memory 330, storage component 340, communication interface 370, and/or the like) may receive transaction data relating to a credit account, associated with a user, after obtaining the digital signature information, as described above in connection with FIGS. 1A and 1B. In some implementations, the transaction data may include information identifying a transaction amount.

As further shown in FIG. 5, process 500 may include determining, after receiving the transaction data, an amount, of the type of cryptocurrency, that satisfies the transaction amount (block 530). For example, transaction backend 210 (e.g., using processor 320, memory 330, storage component 340, communication interface 370, and/or the like) may determine, after receiving the transaction data, an amount, of the type of cryptocurrency, that satisfies the transaction amount, as described above in connection with FIGS. 1A and 1B.

As further shown in FIG. 5, process 500 may include performing, using the digital signature information, an action to conduct a sale of a portion of the quantity of the type of cryptocurrency based on determining the amount (block 540). For example, transaction backend 210 (e.g., using processor 320, memory 330, storage component 340, communication interface 370, and/or the like) may perform, using the digital signature information, an action to conduct a sale of a portion of the quantity of the type of cryptocurrency based on determining the amount, as described above in connection with FIGS. 1A and 1B.

As further shown in FIG. 5, process 500 may include causing proceeds from the sale to be transferred to the credit account as payment for the transaction amount (block 550). For example, transaction backend 210 (e.g., using processor 320, memory 330, storage component 340, communication interface 370, and/or the like) may cause proceeds from the sale to be transferred to the credit account as payment for the transaction amount, as described above in connection with FIGS. 1A and 1B.

Process 500 may include additional implementations, such as any single implementation or any combination of implementations described below and/or in connection with one or more other processes described elsewhere herein.

In some implementations, the one or more processors may be further configured to determine an additional amount, of the type of cryptocurrency, that satisfies a cost associated with computing resources and/or memory resources needed to conduct the sale of the portion of the quantity of the type of cryptocurrency. In some implementations, the one or more processors, when performing the action, may be configured to perform the action further based on determining the additional amount.

In some implementations, the one or more processors may be further configured to determine an additional amount, of the type of cryptocurrency, that satisfies a cost associated with transferring the proceeds to the credit account. In some implementations, the one or more processors, when performing the action, may be configured to perform the action further based on determining the additional amount.

In some implementations, the digital signature information may include one or more private keys. In some implementations, the one or more processors, when performing the action, may be configured to digitally sign the portion of the quantity of the type of cryptocurrency using the one or more private keys. In some implementations, the quantity of the type of cryptocurrency may be independently maintained by the user.

In some implementations, the one or more processors may be further configured to monitor a current value of the type of cryptocurrency, relative to a currency associated with the transaction amount, over time. In some implementations, the one or more processors, when performing the action, may be configured to perform the action based on monitoring the current value of the type of cryptocurrency relative to the official currency.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
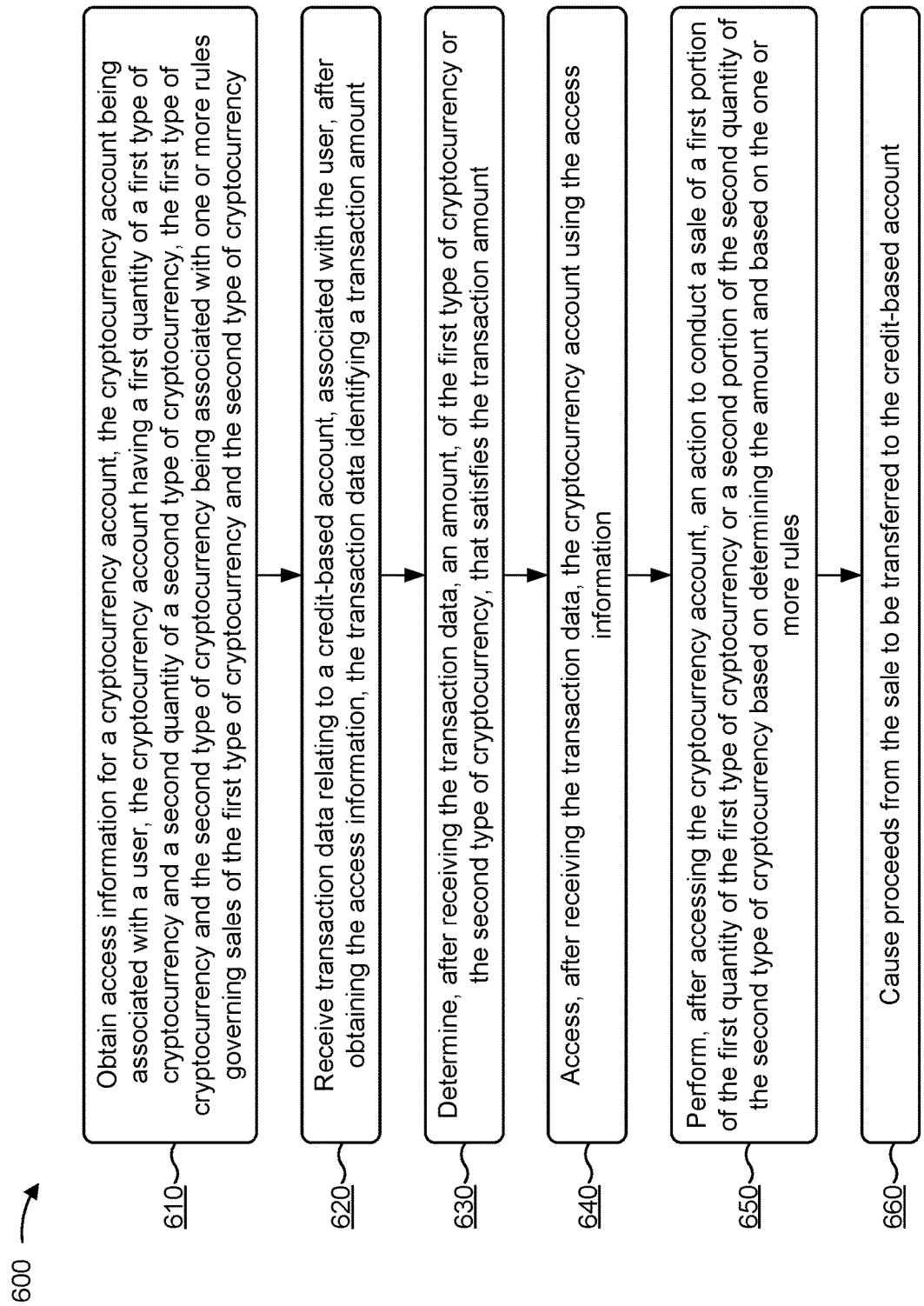
FIG. 6 is a flow chart of an example process for automatically conducting a sale of a user's cryptocurrency.

FIG. 6 is a diagram of an example process 600 for automatically conducting a sale of a user's cryptocurrency. In some implementations, one or more process blocks of FIG. 6 may be performed by transaction backend 210. In some implementations, one or more process blocks of FIG. 6 may be performed by another device or a group of devices separate from or including transaction backend 210, such as cryptocurrency exchange server 220. In some implementations, a non-transitory computer-readable medium may store instructions. In some implementations, the instructions may include one or more instructions that, when executed by one or more processors of a transaction backend (e.g., transaction backend 210), cause the one or more processors to perform process 600.

As shown in FIG. 6, process 600 may include obtaining access information for a cryptocurrency account (block 610). For example, transaction backend 210 (e.g., using processor 320, memory 330, storage component 340, input component 350, communication interface 370, and/or the like) may obtain access information for a cryptocurrency account, as described above in connection with FIGS. 1A and 1B. In some implementations, the cryptocurrency account may be associated with a user. In some implementations, the cryptocurrency account may have a first quantity of a first type of cryptocurrency and a second quantity of a second type of cryptocurrency. In some implementations, the first type of cryptocurrency and the second type of cryptocurrency may be associated with one or more rules governing sales of the first type of cryptocurrency and the second type of cryptocurrency.

As further shown in FIG. 6, process 600 may include receiving transaction data relating to a credit-based account, associated with the user, after obtaining the access information (block 620). For example, transaction backend 210 (e.g., using processor 320, memory 330, storage component 340, communication interface 370, and/or the like) may receive transaction data relating to a credit-based account, associated with the user, after obtaining the access information, as described above in connection with FIGS. 1A and 1B. In some implementations, the transaction data may identify a transaction amount.

As further shown in FIG. 6, process 600 may include determining, after receiving the transaction data, an amount, of the first type of cryptocurrency or the second type of cryptocurrency, that satisfies the transaction amount (block 630). For example, transaction backend 210 (e.g., using processor 320, memory 330, storage component 340, communication interface 370, and/or the like) may determine, after receiving the transaction data, an amount, of the first type of cryptocurrency or the second type of cryptocurrency, that satisfies the transaction amount, as described above in connection with FIGS. 1A and 1B.

As further shown in FIG. 6, process 600 may include accessing, after receiving the transaction data, the cryptocurrency account using the access information (block 640). For example, transaction backend 210 (e.g., using processor 320, memory 330, storage component 340, communication interface 370, and/or the like) may access, after receiving the transaction data, the cryptocurrency account using the access information, as described above in connection with FIGS. 1A and 1B.

As further shown in FIG. 6, process 600 may include performing, after accessing the cryptocurrency account, an action to conduct a sale of a first portion of the first quantity of the first type of cryptocurrency or a second portion of the second quantity of the second type of cryptocurrency based on determining the amount and based on the one or more rules (block 650). For example, transaction backend 210 (e.g., using processor 320, memory 330, storage component 340, communication interface 370, and/or the like) may perform, after accessing the cryptocurrency account, an action to conduct a sale of a first portion of the first quantity of the first type of cryptocurrency or a second portion of the second quantity of the second type of cryptocurrency based on determining the amount and based on the one or more rules, as described above in connection with FIGS. 1A and 1B.

As further shown in FIG. 6, process 600 may include causing proceeds from the sale to be transferred to the credit-based account (block 660). For example, transaction backend 210 (e.g., using processor 320, memory 330, storage component 340, communication interface 370, and/or the like) may cause proceeds from the sale to be transferred to the credit-based account, as described above in connection with FIGS. 1A and 1B.

Process 600 may include additional implementations, such as any single implementation or any combination of implementations described below and/or in connection with one or more other processes described elsewhere herein.

In some implementations, the one or more rules may permit sales of the first type of cryptocurrency and prevent sales of the second type of cryptocurrency when a current value of the first type of cryptocurrency satisfies a first threshold and a current value of the second type of cryptocurrency does not satisfy a second threshold. In some implementations, the one or more instructions, that cause the one or more processors to perform the action, may cause the one or more processors to perform the action based on whether the current value of the first type of cryptocurrency satisfies the first threshold and based on whether the current value of the second type of cryptocurrency satisfies the second threshold.

In some implementations, the one or more rules may identify a quantity of sales of the first type of cryptocurrency, or of the second type of cryptocurrency, that are permitted per unit time. In some implementations, the one or more instructions, that cause the one or more processors to cause the proceeds to be transferred to the credit-based account, may cause the one or more processors to cause the proceeds to be transferred to the credit-based account via ACH.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations, described herein, provide a transaction backend 210 that is capable of automatically conducting sale(s) of a user's cryptocurrency based on transactions conducted using the user's financial account (e.g., a credit-based account, such as a credit card account, and/or the like). In some implementations, and in a case where a user's cryptocurrency is held in a cryptocurrency account managed by a cryptocurrency exchange, transaction backend 210 is capable of accessing the user's cryptocurrency account via the user's authentication credentials and/or an access token. In some implementations, and in a case where the user manages the user's cryptocurrency independently, transaction backend 210 is capable of accessing the cryptocurrency via cryptocurrency-related private keys. In some implementations, transaction backend 210 is capable of conducting sale(s) of an amount of the user's cryptocurrency that covers the user's credit-based transaction amount(s) as well as any needed transaction costs (e.g., fees charged by a cryptocurrency exchange to facilitate the sale(s), fees relating to data processing associated with cryptocurrency transactions (such as "miner" fees, "gas" costs, and/or the like), and/or the like), and causing funds or proceeds from the sale(s) to be transferred to the user's credit-based account (e.g., via ACH). In some implementations, transaction backend 210 is capable of permitting a user to set rules that govern sale(s) of the user's cryptocurrency, including rules associated with multiple types of cryptocurrency (e.g., in a case where the user owns multiple types of cryptocurrency) depending on current market values of the cryptocurrencies.

In this way, a user may utilize a traditional payment method, such as a credit card, to make purchases, and have a balance on the payment account to be automatically paid off using the user's cryptocurrency. Automatic triggering of sale(s) of a user's cryptocurrency reduces or eliminates a need for the user to perform any actions using a computing device to conduct such sale(s), which reduces or eliminates the possibility of human error, and conserves power resources, computing resources, and memory resources of the computing device. In addition, permitting a user to set rules that govern sale(s) of the user's cryptocurrency, depending on a current market value of the cryptocurrency, also avoids cryptocurrency sales at values that are inconsistent with the user's perceived value of the cryptocurrency. Furthermore, automatic determinations of transaction costs, associated with a cryptocurrency sale, also reduce or eliminate a need for the user to manually determine such costs (which would otherwise be inefficient and error prone).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
    receiving, by a device, transaction data based on a first quantity of cryptocurrency, the transaction data including information identifying a transaction amount;
    determining, by the device, a type of the cryptocurrency based on a market value of the cryptocurrency exceeding a threshold;
    determining, by the device, that a sale of the cryptocurrency is permitted based on a periodicity of the sale of the cryptocurrency being less than a rule governing a periodicity of cryptocurrency sales;
    determining, by the device, a second quantity of the cryptocurrency that satisfies the transaction amount based on receiving the transaction data and determining the sale of the cryptocurrency is permitted;
    accessing, by the device, a cryptocurrency account via a cryptocurrency server; and
    selling, by the device, a portion of the first quantity of the cryptocurrency associated with the cryptocurrency account using the cryptocurrency server based on the second quantity of the cryptocurrency.

2. The method of claim 1, wherein accessing the cryptocurrency account via the cryptocurrency server comprises:
    logging into the cryptocurrency server.

3. The method of claim 1, further comprising:
    determining a third quantity, of the cryptocurrency, that satisfies a cost associated with computing resources or memory resources to facilitate the selling of the portion of the first quantity of the cryptocurrency.

4. The method of claim 1, further comprising:
determining a third quantity, of the cryptocurrency, that satisfies a cost associated with transferring proceeds to the cryptocurrency account.

5. The method of claim 1, further comprising:
transferring proceeds from selling the portion of the first quantity of the cryptocurrency to an account as payment for the transaction amount.

6. The method of claim 1, further comprising:
monitoring the market value of the cryptocurrency, relative to a currency associated with the transaction amount over time; and
wherein selling the portion of the first quantity of the cryptocurrency comprises:
selling the portion of the first quantity of the cryptocurrency based on monitoring the market value of the cryptocurrency relative to the currency.

7. The method of claim 1, further comprising:
selecting, using digital signature information, the portion of the first quantity of the cryptocurrency based on determining the second quantity that satisfies the transaction amount.

8. A device comprising:
one or more non-transitory memories; and
one or more processors, coupled to the one or more non-transitory memories,
the one or more non-transitory memories containing instructions that when executed by the one or more processors causes the one or more processors to perform the steps of:
receiving transaction data based on a first quantity of cryptocurrency,
the transaction data including information identifying a transaction amount;
determining a type of the cryptocurrency based on a market value of the cryptocurrency exceeding a threshold;
determining that a sale of the cryptocurrency is permitted based on a periodicity of the sale of the cryptocurrency being less than a rule governing a periodicity of cryptocurrency sales,
the rule governing the periodicity of cryptocurrency sales permitting a sale a certain quantity of times for a certain period;
determining a second quantity of the cryptocurrency that satisfies the transaction amount based on receiving the transaction data and determining the sale of the cryptocurrency is permitted;
accessing a cryptocurrency account via a cryptocurrency server; and
selling a portion of the first quantity of the cryptocurrency associated with the cryptocurrency account using the cryptocurrency server based on the second quantity of the cryptocurrency.

9. The device of claim 8, wherein the one or more processors further perform the step of:
transferring proceeds from selling the portion of the first quantity of the cryptocurrency to an account as payment for the transaction amount.

10. The device of claim 8, wherein the one or more processors further perform the step of:
determining a third quantity, of the cryptocurrency, that satisfies a cost associated with computing resources or memory resources to facilitate the selling of the portion of the first quantity of the cryptocurrency; and
wherein the one or more processors, when selling the portion of the first quantity of the cryptocurrency, perform the step of:
selling the portion of the first quantity of the cryptocurrency based on determining the third quantity.

11. The device of claim 8, wherein the one or more processors further perform the step of:
determining a third quantity, of the cryptocurrency, that satisfies a cost associated with transferring proceeds to an account; and
wherein the one or more processors, when selling the portion of the first quantity of the cryptocurrency, perform the step of:
selling the portion of the first quantity of the cryptocurrency based on determining the third quantity.

12. The device of claim 8, wherein the one or more processors further perform the step of:
accessing the cryptocurrency account via private keys.

13. The device of claim 8, wherein the one or more processors further perform the step of:
accessing the cryptocurrency account using a username for the cryptocurrency account and a password for the cryptocurrency account.

14. The device of claim 8, wherein the one or more processors further perform the step of:
monitoring the market value of the cryptocurrency, relative to a currency associated with the transaction amount, over time; and
wherein the one or more processors, when selling the portion of the first quantity of the cryptocurrency, perform the step of:
selling the portion of the first quantity of the cryptocurrency based on monitoring the market value of the cryptocurrency relative to the currency.

15. A non-transitory computer-readable medium storing one or more instructions when executed by one or more processors cause the one or more processors to perform the steps of:
receiving transaction data, relating to an account, based on a first quantity of cryptocurrency,
the transaction data including information identifying a transaction amount;
determining a type of the cryptocurrency based on a market value of the cryptocurrency exceeding a threshold;
determining that a sale of the cryptocurrency is permitted based on a periodicity of the sale of the cryptocurrency being less than a rule governing a periodicity of cryptocurrency sales;
determining a second quantity of the cryptocurrency that satisfies the transaction amount based on receiving the transaction data and determining the sale of the cryptocurrency is permitted;
logging into a cryptocurrency server to access a cryptocurrency account; and
selling a portion of the first quantity of the cryptocurrency associated with the cryptocurrency account using the cryptocurrency server based on the second quantity.

16. The non-transitory computer-readable medium of claim 15, wherein the one or more instructions when executed by the one or more processors further cause the one or more processors to perform the step of:
transferring proceeds from selling the portion of the first quantity of the cryptocurrency to the account as payment for the transaction amount.

17. The non-transitory computer-readable medium of claim 15, wherein the one or more instructions when executed by the one or more processors further cause the one or more processors to perform the step of:

digitally signing the portion of the first quantity of the cryptocurrency using one or more private keys.

18. The non-transitory computer-readable medium of claim 15, wherein the one or more instructions when executed by the one or more processors further cause the one or more processors to perform the steps of:

monitoring the market value of the type of cryptocurrency, relative to a currency associated with the transaction data, over time; and wherein the one or more instructions, that cause the one or more processors to sell the portion of the first quantity of the cryptocurrency, cause the one or more processors to perform the step of:

selling the portion of the first quantity of the cryptocurrency based on monitoring the market value of the type of cryptocurrency relative to the currency.

19. The non-transitory computer-readable medium of claim 15, wherein the one or more instructions when executed by the one or more processors further cause the one or more processors to perform the step of:

determining a third quantity, of the cryptocurrency, that satisfies a cost associated with computing resources to facilitate the selling of the portion of the first quantity of the cryptocurrency.

20. The non-transitory computer-readable medium of claim 15, wherein the one or more instructions when executed by the one or more processors further cause the one or more processors to perform the step of:

determining a third quantity, of the cryptocurrency, that satisfies a cost associated with transferring proceeds to the account.

* * * * *